US009009065B2

(12) United States Patent
Reis et al.

(10) Patent No.: US 9,009,065 B2
(45) Date of Patent: Apr. 14, 2015

(54) PROMOTING CONTENT FROM AN ACTIVITY STREAM

(75) Inventors: Davi Reis, Belo Horizonte (BR); Christian Oestlien, New York, NY (US); Eider Silva de Oliveira, Belo Horizonte (BR); Marcus A. Leal, Rio de Janeiro (BR); Igor P. Soares, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 440 days.

(21) Appl. No.: 12/971,987

(22) Filed: Dec. 17, 2010

(65) Prior Publication Data

US 2012/0158494 A1    Jun. 21, 2012

(51) Int. Cl.
```
G06Q 30/00    (2012.01)
G06Q 30/02    (2012.01)
G06Q 50/00    (2012.01)
```

(52) U.S. Cl.
CPC ........ G06Q 30/0241 (2013.01); G06Q 30/0255 (2013.01); G06Q 30/0251 (2013.01); G06Q 30/0277 (2013.01); G06Q 50/01 (2013.01)

(58) Field of Classification Search
CPC ............ G06Q 30/0241–30/0277; G06Q 50/01
USPC ........................................... 705/14.53, 14.49
See application file for complete search history.

(56) References Cited

U.S. PATENT DOCUMENTS

| | | | |
|---|---|---|---|
| 6,892,354 B1 * | 5/2005 | Servan-Schreiber et al. . | 715/733 |
| 6,978,024 B2 * | 12/2005 | Shinzaki ........................ | 380/277 |
| 7,634,466 B2 * | 12/2009 | Rose et al. ............................. | 1/1 |
| 7,949,560 B2 * | 5/2011 | Peeters et al. ............... | 705/14.39 |
| 7,974,974 B2 * | 7/2011 | Tankovich et al. ............ | 707/729 |
| 2002/0101994 A1 * | 8/2002 | Shinzaki ....................... | 380/277 |
| 2002/0129015 A1 * | 9/2002 | Caudill et al. ..................... | 707/6 |
| 2004/0088363 A1 * | 5/2004 | Doemling et al. ............ | 709/207 |
| 2006/0122884 A1 * | 6/2006 | Graham et al. ................. | 705/14 |
| 2006/0277255 A1 * | 12/2006 | Orsolini et al. ............... | 709/205 |
| 2006/0277482 A1 * | 12/2006 | Hoffman et al. .............. | 715/764 |
| 2006/0294134 A1 * | 12/2006 | Berkhim et al. .............. | 707/102 |
| 2007/0027751 A1 * | 2/2007 | Carson et al. ................... | 705/14 |
| 2007/0055565 A1 * | 3/2007 | Baur et al. ...................... | 705/14 |
| 2007/0061297 A1 | 3/2007 | Bihun et al. | |

(Continued)

FOREIGN PATENT DOCUMENTS

KR    10-2010-0006752    1/2010

OTHER PUBLICATIONS

Authorized officer Chung Keun Lee, International Search Report and Written Opinion in PCT/US2011/064981, mailed Aug. 27, 2012, 9 pages.

(Continued)

*Primary Examiner* — Bennett Sigmond
(74) *Attorney, Agent, or Firm* — Fish & Richardson P.C.

(57) ABSTRACT

Methods, systems, and apparatus, including computer programs encoded on a computer-readable storage medium, for providing a method that includes receiving an indication from a user to promote an item that is included in an activity stream associated with the user, the activity stream being presented in a social context by a social application; receiving a request for an advertisement; determining the item is responsive to the request; determining one or more advertisements responsive to the request; ranking the item and the one or more advertisements; and providing the item in response to the request rather than the one or more advertisements and based at least in part on the rankings.

45 Claims, 8 Drawing Sheets

(56) References Cited

U.S. PATENT DOCUMENTS

| | | | |
|---|---|---|---|
| 2007/0112761 A1* | 5/2007 | Xu et al. | 707/5 |
| 2007/0168490 A1* | 7/2007 | Kent et al. | 709/223 |
| 2007/0244760 A1* | 10/2007 | Bodnar et al. | 705/14 |
| 2008/0071616 A1* | 3/2008 | Hovnanian et al. | 705/14 |
| 2008/0109285 A1* | 5/2008 | Reuther et al. | 705/7 |
| 2008/0195596 A1* | 8/2008 | Sisk et al. | 707/5 |
| 2008/0249855 A1* | 10/2008 | Collins et al. | 705/14 |
| 2008/0294607 A1* | 11/2008 | Partovi et al. | 707/3 |
| 2009/0024554 A1* | 1/2009 | Murdock et al. | 706/48 |
| 2009/0048922 A1* | 2/2009 | Morgenstern et al. | 705/14 |
| 2009/0049041 A1* | 2/2009 | Tareen et al. | 707/5 |
| 2009/0070310 A1* | 3/2009 | Srivastava et al. | 707/5 |
| 2009/0125511 A1* | 5/2009 | Kumar | 707/5 |
| 2009/0187486 A1* | 7/2009 | Lefenfeld et al. | 705/14 |
| 2009/0216621 A1* | 8/2009 | Anderson et al. | 705/10 |
| 2009/0240680 A1* | 9/2009 | Tankovich et al. | 707/5 |
| 2009/0254434 A1* | 10/2009 | Ganz et al. | 705/14.45 |
| 2010/0017259 A1* | 1/2010 | Luo | 705/10 |
| 2010/0100545 A1 | 4/2010 | Jeavons | |
| 2010/0119053 A1 | 5/2010 | Goeldi | |
| 2010/0121705 A1* | 5/2010 | Ramer et al. | 705/14.46 |
| 2010/0153371 A1* | 6/2010 | Singh | 707/722 |
| 2010/0199299 A1* | 8/2010 | Chang et al. | 725/32 |
| 2010/0217663 A1* | 8/2010 | Ramer et al. | 705/14.42 |
| 2010/0268582 A1* | 10/2010 | Tanaka | 705/14.4 |
| 2010/0293175 A1* | 11/2010 | Vadrevu et al. | 707/759 |
| 2011/0082915 A1* | 4/2011 | Carr et al. | 709/219 |
| 2011/0153377 A1* | 6/2011 | Novikov et al. | 705/7.11 |
| 2011/0153412 A1* | 6/2011 | Novikov et al. | 705/14.42 |
| 2011/0153421 A1* | 6/2011 | Novikov et al. | 705/14.52 |
| 2011/0314084 A1* | 12/2011 | Saretto et al. | 709/203 |
| 2012/0078727 A1* | 3/2012 | Lee | 705/14.66 |
| 2012/0089621 A1* | 4/2012 | Liu et al. | 707/749 |
| 2012/0131626 A1* | 5/2012 | Fernandez Gutierrez | 725/109 |
| 2012/0158494 A1* | 6/2012 | Reis et al. | 705/14.49 |

OTHER PUBLICATIONS

Authorized officer Nora Lindner, International Preliminary Report on Patentability in PCT/US2011/064981, mailed Jun. 27, 2013, 6 pages.

* cited by examiner

1

PROMOTING CONTENT FROM AN ACTIVITY STREAM

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for content (e.g., advertisements) to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers are respectively willing to pay for presentation of their advertisements ("ads"). In turn, an auction can be performed and the advertisement slots can be allocated to advertisers according, among other things, to their bids and/or the relevance of the advertisement to content presented on a page hosting the slot or a request that is received for the advertisement.

SUMMARY

In general, one innovative aspect of the subject matter described in this specification can be implemented in methods that include a first method that comprises: receiving an indication from a user to promote an item that is included in an activity stream associated with the user, the activity stream being presented in a social context by a social application; receiving a request for an advertisement; determining the item is responsive to the request; determining one or more advertisements responsive to the request; ranking the item and the one or more advertisements; and providing the item in response to the request rather than the one or more advertisements and based at least in part on the rankings.

In general, another innovative aspect of the subject matter described in this specification can be implemented in methods that include a second method that comprises: receiving a request for an advertisement to be published on a web page by a publisher; determining one or more non-advertising content items responsive to the request; ranking the one or more non-advertising content items; and providing one of the one or more non-advertising content items in response to the request and based at least in part on the rankings.

These and other implementations can each optionally include one or more of the following features. The second method can further comprise: determining one or more advertisements responsive to the request; ranking the one or more advertisements; and evaluating a highest-ranked advertisement and a highest-ranked non-advertising content item based on one or more criteria; where providing the one or more non-advertisement content items is based at least in part on the evaluation. The criteria can relate to a relevance of the content item or the advertisement to the request. The criteria can relate to how often ads are served in response to the request. The criteria can relate to how high a relevance is for the non-advertising content item and how low a relevance is of the highest-ranked advertisement. The criteria can relate to a location of the user, a current date and time of the request, the publisher(s) of the advertisement, and/or the highest-ranked non-advertising content.

These and other implementations can each optionally include one or more of the following features. The first method can further comprise compensating the publisher by a system that provides the non-advertising content item. The first method can further comprise charging a provider of the non-advertising content item a nominal fee for publication. The first method can further comprise charging the provider of the non-advertising content item no fee for publication. The first method can further comprise: receiving one or more non-advertising content items and metadata describing content included therein; and storing the one or more non-advertising content items and the metadata. The metadata can be used to rank the one or more non-advertising content items. Receiving the one or more non-advertising content items can include receiving a selection of a content item from a user. The selection can be a selection of a content item authored by the user. One or more of the one or more non-advertising content items can exclude a link to a landing page. One or more of the one or more non-advertising content items can be selected from the group comprising blog entries, web pages, news items, videos, music, images, games, or any other multimedia content. The selection can be a selection of a control that allows for publication of a content item. The control can be a +1 control. The control can be presented in a toolbar. The selection can include a message from the user to be published along with the non-advertising content item. The message can be displayed as an annotation with the non-advertising content item. The annotation can include a message portion and a re-publication control to allow a recipient to re-publish the non-advertising content item. The control can be associated with an application. The application can be an operating system of a user device. The application can be browser.

In general, yet another innovative aspect of the subject matter described in this specification can be implemented in methods that include a third method that comprises: receiving a request for an advertisement to be displayed in an advertising slot on a web-page or search results page associated with a publisher; identifying a non-advertising content item responsive to the request; identifying an advertisement responsive to the request; evaluating a relevance of the non-advertising content item and the advertisement to the request; and providing one of the advertisement or the non-advertising content item based at least in part on the evaluating.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
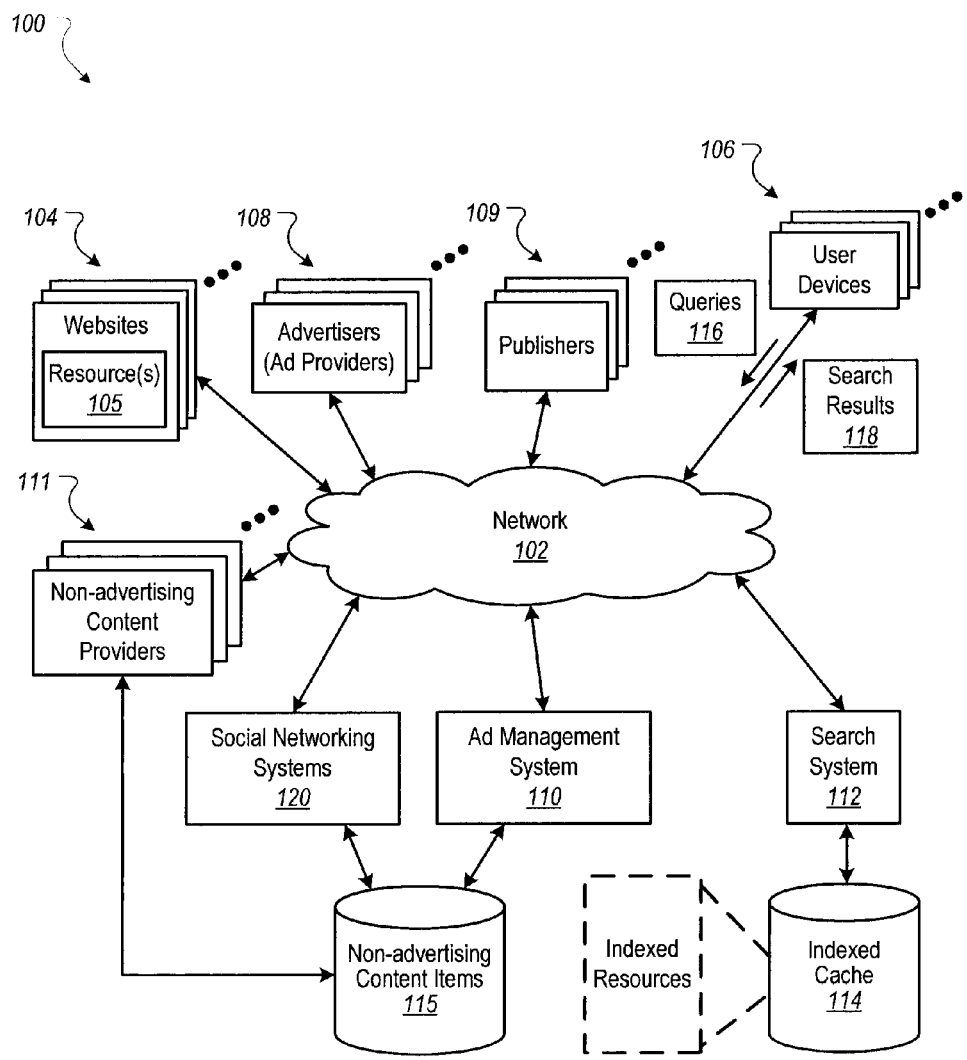
FIG. 1 is a block diagram of an example environment for promoting activity stream content.

When a user requests on-line content (e.g., a web page or another online resource), content requests can be initiated to request content from a content publisher for presentation on a user device. For example, content publishers can include publishers of web sites or search engines that are publishing search results responsive to a query. One or more additional content items (e.g., ads) can be provided along with the requested content. As a result, the presented content can include, for example, text, images, audio, video, advertisements (or ads) or other content selected for presentation to the user. In response to each content request received, content can be served, including one or more ads. Ads may advertise a product or service, on behalf of an advertiser, in a format that may entice an action (e.g., clicking, buying, etc.) by the user who sees the ad. In some implementations, some ads can be replaced by non-advertising content. For example, replacement content can have a social component or context, such as content from social networking web sites, including activity stream content.

In general, activity streams, as provided by social networking web sites and applications, allow a user to publish user updates and make the updates accessible or viewable by designates. For example, a user can publish messages, photos, or other content to his activity stream, and share the content with individuals, family, friends, or other groups. Alternatively, the user's publication of content can be to a presence associated with the user in a social environment. In another example, the publication can be directly to a subscriber to the updates. In some implementations, the publication can be to an area that is designated for providing updated content for the user (e.g., a wall or social profile page). Other mechanisms are possible for providing the publication medium.

As an example, entries that are in an activity stream, such as the activity stream that a user sees on a social networking web site, can include content from various users. The content can include, for example, social postings that a user has posted in order to share (e.g., on a social networking web site) with one or more other people in the user's social circles, including friends, family, coworkers, etc. For example, the content for the posting can be a written account of the user's thoughts or actions of the day. The content can also include postings by people in the user's social circles, such as in response to the original posting by the user and any subsequent postings by others. Any or all postings made in this way can be potential content for "promoting" by the user, namely selecting portions of the content to promote to others. The act of promoting can make the content available as non-advertising content that can be served, for example, in an ad slot in lieu of an ad. For example, an ad server may periodically include a user's promoted content, e.g., from a social networking web site, for publication in an ad slot. Doing so from time-to-time can raise awareness of ads as well as to the additional content, such as to avoid "ad blindness" where users don't ever look at what is posted in ad blocks. For example, if a user discovers that ads are periodically replaced with content by one or more of the user's friends, then the user may start to pay attention to ad slots. As a result, interest in ads can increase and higher click-through rates can occur, which can improve the overall average effectiveness of ads.

To allow a user to promote content, content that is displayed in an activity stream can include controls that the user can select to promote the content. Tools can allow the user to select the specific content to promote and to identify the people to which to promote the content. In some implementations, designating content for promotion does not guarantee that the non-advertising content is ever served in lieu of an ad, but makes the content available to, for example, an advertising serving system. As a result, users can share content with others, including friends and family.

Although the examples in this disclosure focus primarily on promoting content from an activity stream, promotion of non-advertising content can occur from other sources, including content on a web site that is not a social networking web site. Furthermore, content that can be promoted from any source can include text, audio, video, images, ads, or any kind of content, including multi-media, that can be found on the Internet. On any given web site or web page or by way of application or as part of an operating system, tools can exist that allow the user to select content to be promoted and to designate the people to which promotion is to occur. In some implementations, once the non-advertising content appears in an ad slot, the source of the non-advertising content can be made available (e.g., in an ad block or by selecting the non-advertising content). As a result, the user can discover the source (e.g., the URL) of the promoted content, as well as an identification of the person who promoted the content, and so on.

FIG. 1 is a block diagram of an example environment for promoting activity stream content. The example environment 100 includes an ad management system 110 that manages advertising services and one or more social networking systems 120 that allow users to interact with other users within a social framework. The example environment 100 includes a network 102, such as a local area network (LAN), a wide area network (WAN), the Internet, or a combination thereof. The network 102 connects websites 104, user devices 106, advertisers 108, publishers 109, non-advertising content providers 111, the ad management system 110, and the social networking systems 120. The example environment 100 may include many thousands of websites 104, user devices 106, advertisers 108, publishers 109, and non-advertising content providers 111.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, such as one of the publishers 109, which can be the entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information in hyperlinks) and/or embedded instructions (such as JavaScript scripts).

Resources 105 can include any non-advertising content that is provided by the non-advertising content providers 111. In this sense, while advertisers 108 can provide ads, or at least define ads to be served by the ad management system 110, the non-advertising content providers 111 can provide non-advertising content. The content from the non-advertising content providers 111 that can be served in place of ads is a subject of this document, including, for example, promoting content from an activity stream.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as ad slots.

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more ad slots in which ads can be presented.

When a resource 105 or search results 118 are requested by a user device 106, the ad management system 110 receives a request for ads to be provided with the resource 105 or search results 118. The request for ads can include characteristics of the ad slots that are defined for the requested resource or search results page, and can be provided to the ad management system 110.

For example, a reference (e.g., URL) to the resource for which the ad slot is defined, a size of the ad slot, and/or media types that are available for presentation in the ad slot can be provided to the ad management system 110. Similarly, keywords associated with a requested resource ("resource keywords") or a search query 116 for which search results are requested can also be provided to the ad management system 110 to facilitate identification of ads (or other non-advertising content) that are relevant to the resource or search query 116.

Based at least in part on data included in the request for ads, the ad management system 110 can select ads that are eligible to be provided in response to the request ("eligible ads"). For example, eligible ads can include ads having characteristics matching the characteristics of ad slots and that are identified as relevant to specified resource keywords or search queries 116. In some implementations, ads having targeting keywords that match the resource keywords or the search query 116 are selected as eligible ads by the ad management system 110.

At times, the ad management system 110 can choose to make an ad replacement by serving non-advertising content in lieu of an ad. The choice to make a replacement can be based on several factors, including, for example, the relevance of the non-advertising content to the specified resource keywords or search queries 116, the inferred relevance to the user's interests, or whether the user (e.g., who issued the search query 116) is a candidate to receive the non-advertising content. For example, to be a candidate, the user may have been identified as a potential recipient (e.g., friend, family member, etc.) by the person who promoted the content. The choice to make a replacement can also be based on other factors, such as, on the number of replacements that have occurred for a particular user, an ad, an ad campaign, an advertiser, or any combination thereof. For example, users can typically be served an ad most of the time, and ads can be replaced only seldomly.

A targeting keyword can match a resource keyword or a search query 116 by having the same textual content ("text") as the resource keyword or search query 116. For example, an ad associated with the targeting keyword "beaches" can be an eligible ad for an ad request including the resource keyword "beaches." Similarly, the ad can be selected as an eligible ad for an ad request including the search query "beaches."

Similarly, keywords can exist in non-advertising content, and can be used in the same way or in different ways. For example, keyword-based relevancy for non-advertising content can be used in combination with whether the user is a potential candidate to receive the non-advertising content in lieu of an ad.

The ad management system 110 can select from the eligible ads and non-advertising content that are to be provided for presentation in ad slots of a resource or search results page based at least in part on results of an auction. For example, for the eligible ads, the ad management system 110 can receive bids from advertisers and allocate the ad slots, based at least in part on the received bids (e.g., based on the highest bidders at the conclusion of the auction). The bids are amounts that the advertisers are willing to pay for presentation (or selection) of their ad with a resource or search results page. For example, a bid can specify an amount that an advertiser is willing to pay for each 1000 impressions (i.e., presentations) of the ad, referred to as a CPM bid. Alternatively, the bid can specify an amount that the advertiser is willing to pay for a selection (i.e., a click-through) of the ad or a conversion following selection of the ad. The selected ads can be determined based on the bids alone, or based on the bids of each bidder being multiplied by one or more factors, such as quality scores derived from ad performance, landing page scores, and or other factors. In some implementations, auctions and bids can be affected by whether serving non-advertising content is an option for an ad or advertiser. The selected ads can be ranked in relation to non-advertising content in order to select either an ad or to make a replacement (e.g., to serve non-advertising content in lieu of an ad).

A conversion can be said to occur when a user performs a particular action related to an ad provided with a resource or search results page. What constitutes a conversion may vary from case-to-case and can be determined in a variety of ways. For example, a conversion may occur when a user clicks on an ad, is referred to a web page, and consummates a purchase there before leaving that web page. A conversion can also be defined by an advertiser to be any measurable/observable user action, such as downloading a white paper, navigating to at least a given depth of a website, viewing at least a certain number of web pages, spending at least a predetermined amount of time on a website or web page, registering on a website, or commenting upon an ad where the comments are visible to others. Other actions that constitute a conversion can also be used.

The system 100 includes one or more social networking systems 120 that provide functions and tools for users to share information in a social network. For example, any of the social networking systems 120 can be a social networking website that users can use to identify friends and social groups (e.g., circles), send and receive email, post messages and multi-media (e.g. photos, video, audio), track social events, provide updates and so on.

As an example, the user may use one of the social networking systems 120 to interface with a social networking web site. The user may see interesting information that has been posted, for example, in an activity stream. The activity stream may include interesting postings that the user has made or a number of postings that have been made by the user's family, friends, etc. The user can select a control to promote selected activity stream content items (e.g., postings).

In some implementations, the user-promoted activity stream content items can be stored in a non-advertising content items data store 115. For example, the social networking systems 120 can store the non-advertising content items immediately when promoted by the user. In some implementations, the ad management system 110 can receive the user-promoted activity stream content from the social networking systems 120 for storage in the non-advertising content items data store 115. In some implementations, the user-promoted activity stream content items can be provided to the non-advertising content providers 111 which can store the content in the non-advertising content items data store 115.

In some implementations, the search system 112 can crawl and index entries in the non-advertising content items data store 115. In this way, non-advertising content items responsive to an ad request can be identified more quickly in real-time.

In some implementations, data in the non-advertising content items data store 115 can be purged or made unavailable, for example, when the information becomes outdated. For example, purging non-advertising content items that reach a certain age (e.g., a week, month or year old) can prevent out-dated or irrelevant information from being used in ad slots.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, zip code, or state level), so that a particular location of a user cannot be determined. In some implementations, opt out features related to social networking systems 120, for example, can allow the user to specify that the user's activity stream content is not to be used in ads, or to anonymize the information in some way.

Example user interfaces for promoting content are described below with reference to FIGS. 2-7B. An example process by which content is promoted is described below with reference to FIG. 8. Various user interface elements for receiving user data input are described below with reference to FIGS. 2-7B. Example user interface elements include text boxes, radio buttons, check boxes, drop-down menus, +1 controls, and hypertext links.

Figure 2:
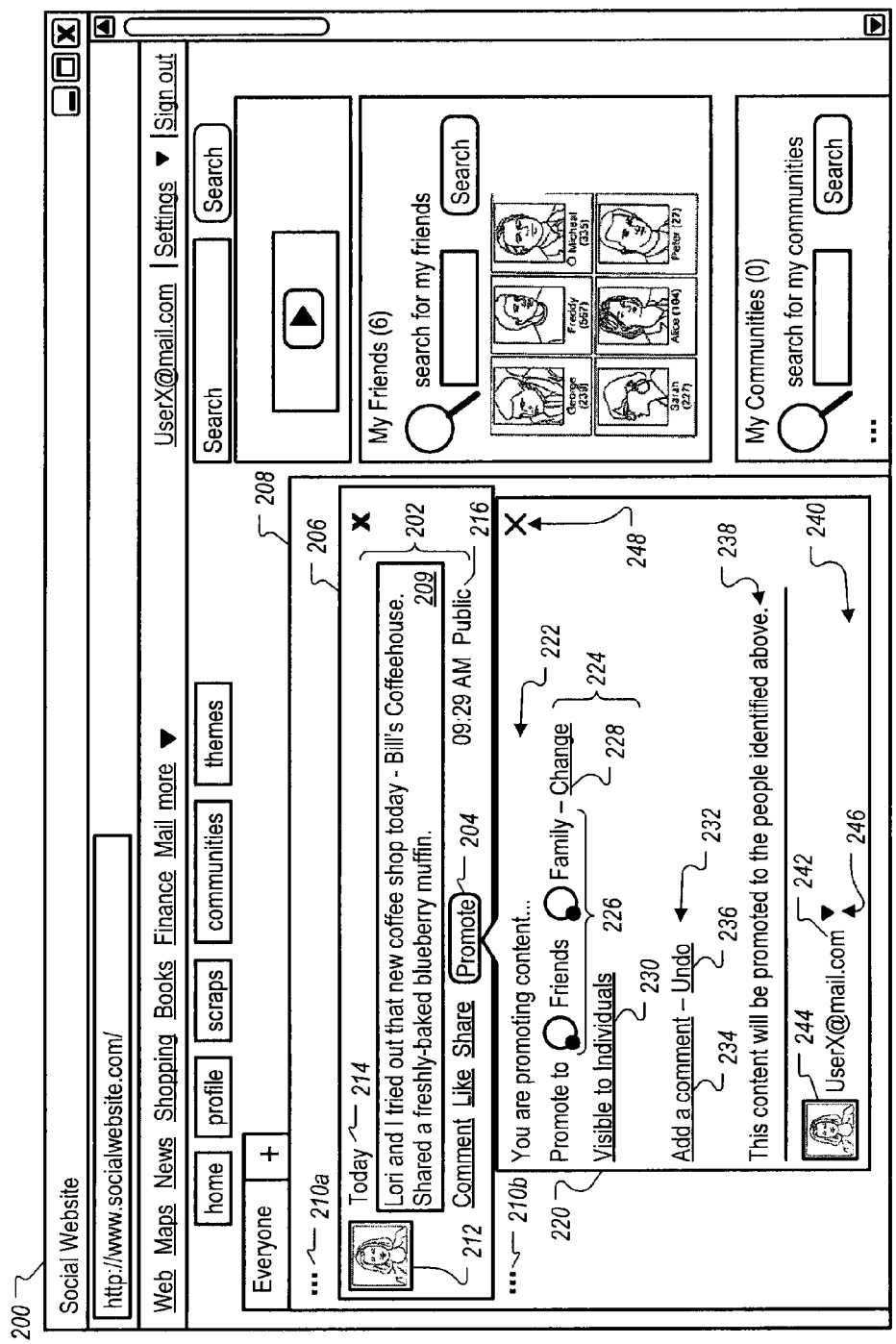
FIG. 2 shows an example user interface that includes activity stream content with controls for promoting the content.

FIG. 2 shows an example user interface 200 that includes activity stream content 202 with a control 204 for promoting the content. The activity stream content 202 and the control 204 can be included in a posting 206 that is part of an activity stream 208. The activity stream content 202 can include a message 209 written by the user when the posting 206 was made, e.g., posted to a social networking web site.

In some implementations, the activity stream 208 can be displayed within a social networking application (e.g., Orkut, MySpace, Buzz, etc.), such as on the corresponding social networking web site. The posting 206 can be one of several postings in the activity stream 208 for the user. For example, ellipses 210a can represent zero or more postings that appear above the posting 206 in the activity stream 208, and ellipses 210b can represent zero or more postings that appear below the posting 206 in the activity stream 208. In general, as is typical with most social networking applications, the newest posting in an activity stream appears at the top. At the same time, comments made by others to a user's original posting (e.g., the posted activity stream content 202) can appear, in chronological order, within the posting 206. This type of activity stream content 202 is an item that can be promoted.

For example, a user may log onto a social networking web site and be provided with the user interface 200 for the corresponding social networking application. The user may view the posting 206 and read the message 209. The posting 206 may be one of the user's own postings, or the posting may be a posting made by one of the user's friends, a family member, or someone else who is associated socially with the user. For example, the posting 206 can be presented in the user's activity stream 208 because one or more of the people associated with the posting 206 are related to the user by a social context within the social networking application. If the message 209 is something that the user believes that others may be interested in seeing (e.g., served in lieu of an ad), then the user may decide to promote the item (e.g., the activity stream content 202).

The posting 206 can include other parts in addition to the message 209. A thumbnail image 212 can identify the user who wrote the message 209 and posted the posting 206. A posting date 214 (e.g., "Today," "March 5," etc.) and a posting time 216 (e.g., "09:29 AM") can indicate the date and time, respectively, that the user posted the posting 206. Additional postings by others, such as comments on the user's posting 206, can include separate date/time indicators.

To initiate the action of promoting the item, the user can select the control 204, (e.g., a "Promote" button or other control). As a result, a series of additional user interfaces can be presented by which the user can complete the promotion, such as starting with a details popup 220. In some implementations, simply selecting the "Promote" button or other control can automatically promote the item without additional user intervention. As a result, the item can be automatically promoted to everyone in the user's social circles or other designated groups or individuals, as identified at that time by the social networking application. However, by providing the series of additional user interfaces, the user can control the people to whom the item is promoted, among other variables. Some implementations can include other promotion controls in addition to the control 204. For example, a "Promote Now" control can be used for immediate promotion (e.g., bypassing the details popup 220). In this example, a "Promote . . . " control can also exist for initiating the series of additional user interfaces. The user can select one or the other control based on user preferences for the current item to be promoted.

When content is promoted, the content can be automatically formatted for compatibility with ad system rendering capabilities. For example, text, images, video, audio etc. can be formatted as needed and stored in the non-advertising content items data store 115 in a format that makes the content ready for immediate use. In some implementations, different format versions can be saved, such as one version for non-mobile devices, and a different version for mobile devices, e.g., which may require a different format due to rendering limitations on the device.

In some implementations, promote controls can be implemented in other ways, including tool bar options, menu selections, right-click selections, "+1" buttons, etc. Controls such as the control 204 can be associated with (or provided by) an application. In some implementations, the application can be the operating system of the user device 106 or the browser that executes on the user device 106.

The details popup 220 can be displayed, for example, if the user selects the control 204. The details popup 220 is just one example implementation of an interface that the user can use to provide detailed information when promoting content. A header 222 can explain why the details popup 220 is displayed, e.g., "You are promoting content . . . " In some implementations, the header 222 can also display the content that is being promoted. For example, the header 222 can say, "You are promoting content posted by Diane: 'Lori and I tried out that new . . . '" Other information related to the posting 206 can also be included in the header 222.

Figure 4:
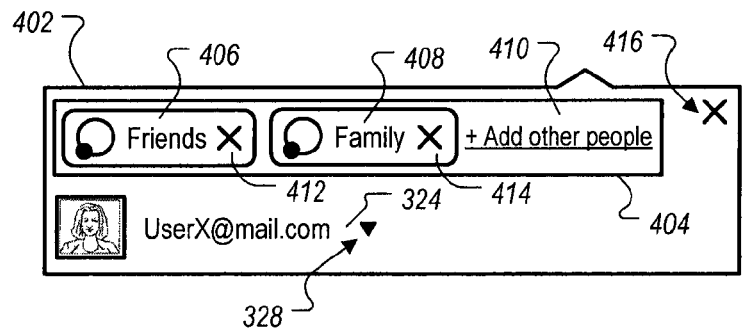
FIG. 4 shows an example visibility change popup for changing visibility settings for promoted content.
Figure 5:
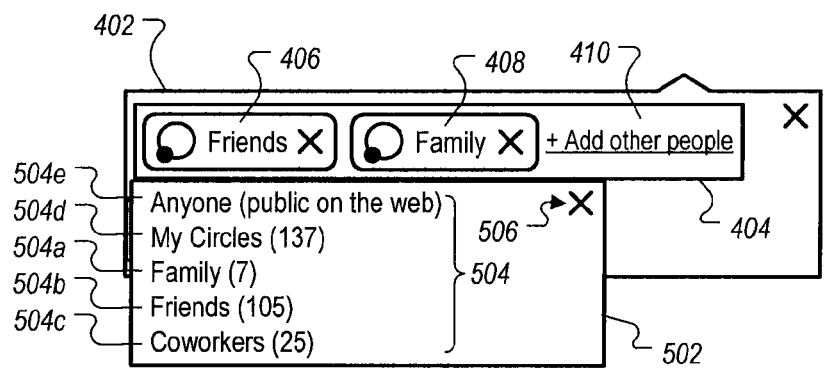
FIG. 5 shows an example groups selection list for displaying selectable visibility groups.

The details popup 220 includes a visibility area 224 that summarizes the groups to whom the user's promoted content is to be made available. For example, current settings 226 indicate that the user's promoted content is to be visible or made available to the user's friends and family. The user can use a change control 228 to change the availability of the promoted content, effectively changing the current settings 226. FIGS. 4 and 5, described below, show example user interfaces that can appear if the user selects the change control 228.

In some implementations, the details popup 220 includes a visible to individuals control 230 that the user can select, for example, to promote the content to specific individuals. For example, by selecting the visible to individuals control 230, a popup or other control can be displayed in which the user can select the identities of individuals to whom to promote the activity stream content 202. In some implementations, the users selected may or may not be in any of the user's social circles of friends, family, etc. The identities of individuals that the user selects using the visible to individuals control 230 can correspond, for example, to the identities of the users on one or more social networking web sites.

The details popup 220 includes a commenting area 232 for adding a comment and/or removing a comment that has been associated the promoted content. The commenting area 232 includes an add comment control 234 for adding a comment (e.g., described below with reference to FIG. 6) and an undo comment control 236 for undoing (or deleting) the added comment. In some implementations, the undo comment control 236 does not appear within the details popup 220 (or may be grayed out or otherwise inactive) until a comment has been added.

A statement 238 that can be displayed within the details popup 220 can identify, to the user, the group(s) of people (e.g., individuals, specified or inferred groups or social circles) who may be eligible to receive the promoted content in lieu of an ad. For example, the statement 238 can state, "This content will be promoted to people identified above." In some implementations, if the user has used the change control 228 to change the visibility to the extent that no other users currently have visibility, then the statement 238 can state, for example, "No users currently have visibility."

In some implementations, filtering or limiting of the promotion of content can occur. As a result, the mere designation by a user to promote content to one or more groups or individuals does not necessarily mean that the content will be served in lieu of an ad. For example, the designated receivers may have blocked receipt (e.g., by setting preferences in a browser or social networking application to block all or selected types of social sharing of content).

Some implementations of the ad management system 110 may filter content promotion requests based on one or more criteria. In some implementations, filtering the request can include evaluating one or more characteristics of a user to whom the promoted content is directed to in order to determine if the request should be granted. In some implementations, filtering can be based on criteria that include imposing limits on promoting content, e.g., limiting the number of content-promoting events (e.g., on a user basis), the number of recipients, and so on. In some implementations, imposed limits on promoting content can be applied to intervals of time, e.g., enforcing a limit of five instances of promoted content per day, twenty instances per week, and so on. As a result, the ad management system 110 can prevent users from promoting content too often.

In some implementations, an email area 240 can identify the user account 242 (e.g., UserX@mail.com) from which the content promotion will occur. For example, the account can be associated with an email address that can be tied to the user's social networking account. Alternatively, the email address may not be tied to any social networking account(s). In some implementations, a user profile image 244 can provide a visual identification to the user as to what account 242 is currently displayed. If the user has multiple computer logins and/or accounts, then the user can use a change control 246, for example, to select a different one of the user's accounts (e.g., UserX@ABCDmail.com). In some implementations, promoting content need not rely upon the user having an email account. For example, the user can belong to one or more social networking systems, and content promoting that the user performs can be tied to a user name, a user account, or other form of user identification.

As a result of selecting which account (email or user login/account) to use, the user is also associating the promoted content with the groups or social circles that correspond to that user account. For example, the user's circles of family and friends may be vastly different for the social networking accounts associated with the user's email addresses UserX@mail.com versus UserX@ABCDmail.com, or one user login/account versus another user login/account.

A close control 248 can be used to exit the details popup 220 and save the current settings and inputs. In some implementations, a cancel control can exist that can allow the user to exit the details popup 220 without saving any changes, essentially restoring the values of the details popup 220 to their original settings (e.g., before the user displayed the popup 220).

In some implementation, the details popup 220 can include a "cancel" option or other control to cancel the act of promoting the content. For example, if the user has a change-of-mind about sharing the ad with family and friends, then the user can select the "cancel" option (not shown in FIG. 2).

When the item is promoted, in addition to the activity stream content 202 that is promoted, other parts of the posting 206 can be promoted. For example, the item that is promoted can include the thumbnail image 212 that identifies the user who generated the content (e.g., by posting on a social networking web site). The item that is promoted can also include the posting date 214 and the posting time 216. None, some or all of these parts of the posting 206 can be included when the item is promoted, or when the resulting non-advertising content item is served in lieu of an ad.

As a result of promoting the item, the activity stream content 202, which in this case is non-advertising content, can be made available as content that can be served in lieu of ads. For example, upon receipt of a request for an ad, the ad management system 110 can determine that the promoted item is responsive to the request. The ad management system 110 can also determine one or more ads that are responsive to the request, and rank the item and the one or more ads. Based at least in part on the rankings, the ad management system 110 can provide the item in response to the ad request rather than the one or more ads.

Figure 3:
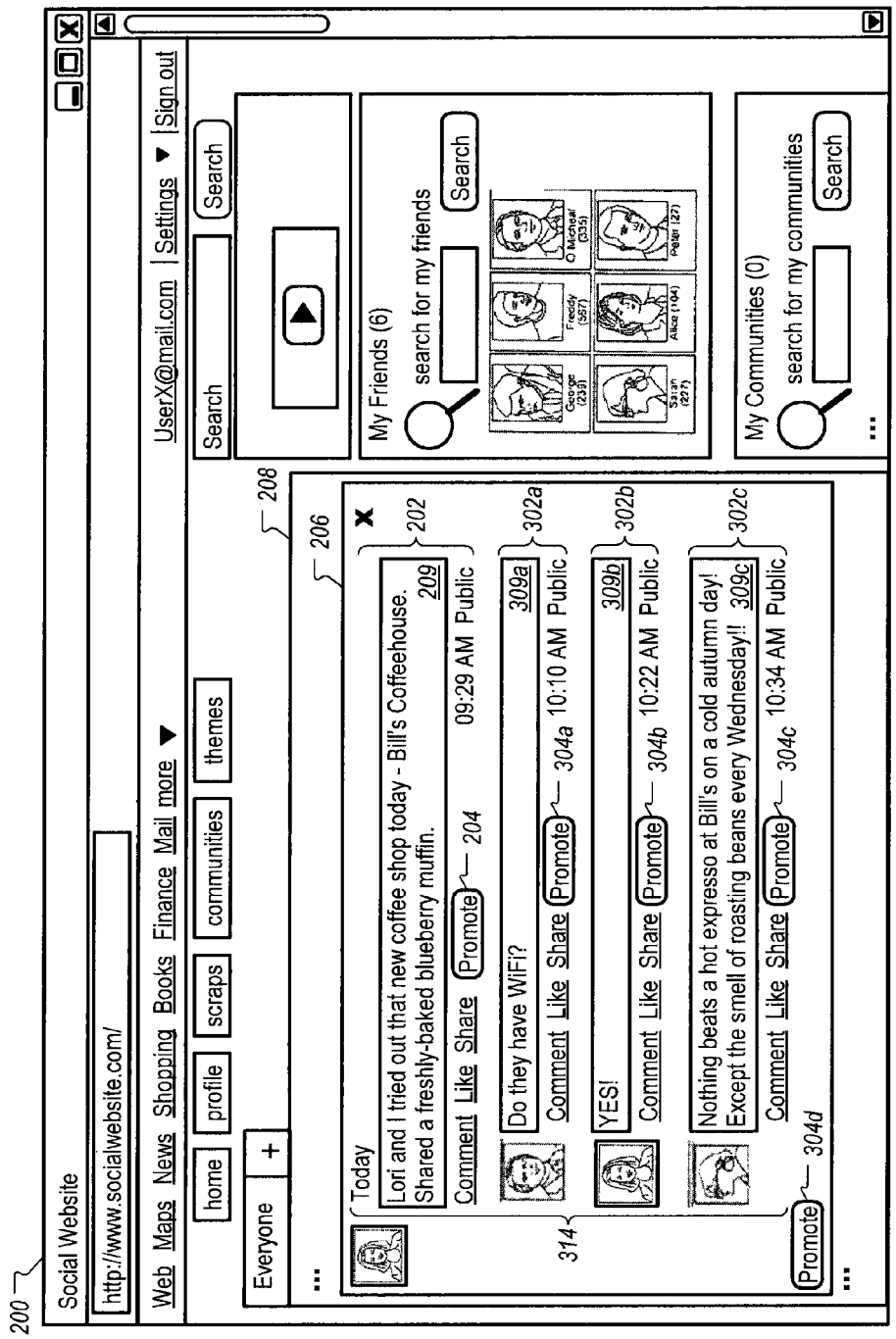
FIG. 3 shows the user interface with additional activity stream content that can be promoted.

FIG. 3 shows the user interface 200 with additional activity stream content 302a-302c that can be promoted. The activity stream content 302a-302c can represent comments and other postings that users have made in response to the original activity stream content 202, including the message 209. For example, messages 309a-309c can include messages that one or more users wrote in response to the original message 209 and/or other posted messages since. The activity stream content 302a-302c can have corresponding controls 304a-304c, respectively, for promoting content. For example, the user can select the control 304b to promote content from the activity stream content 302b.

In some implementations, a promote control 304d can be used to select all of the activity stream content in the posting 206, as represented by content 314. For example, the user can select the promote control 304d to promote the entire social conversation represented by the initially-posted activity stream content 202 and all of the activity stream content 302a-302c posted since.

In some implementations, controls can be provided by which the user can highlight and select portions of content to be promoted. For example, the user can use a text-selection or highlighting tool to select excerpts from any or all of the messages 209 and 309a-309c. As a result, the user can use available controls to select and promote any portions and combinations of the activity stream content 202 and 302a-302c.

In some implementations, other types of content besides content from activity stream content can be promoted, including content from blog entries, web pages, news items, videos, music, images, games, and any other multimedia content, etc. For example, controls such as "Promote" buttons can be available on blog entries, web pages, news stories, and so on. In some implementations, other controls can exist that allow the user to select specific excerpts of content from those other sources. In these examples, when non-advertising content is ultimately served in lieu of an ad, the source can be identified. For example, using a control associated with the presented content, a user can determine the source of the content, such as the specific blog entry, web page, news story, etc.

In some implementations, social networking web sites can provide a dedicated application that includes a user interface to promote content. For example, a menu option, tool bar option or other interface can replace (or be used in addition to) the control 204 for promoting content. When using the dedicated application, for example, the user may be provided with tools for selecting various content items. As a result, several non-advertising content items can be created at once, the result of promotion by a single user.

FIG. 4 shows an example visibility change popup 402 for changing visibility settings for promoted content. In some implementations, the user interface 200 can display the visibility change popup 402 when, for example, the user selects the visibility change control 228 described with reference to FIG. 2. As an example, the user may select the visibility change control 228 to delete one or more of the visibility settings 226 (e.g., "Friends" or "Family") and/or to choose additional visibility options.

In some implementations, when the visibility change popup 402 is displayed, the current visibility settings 226 can be displayed as selectable controls, e.g., controls 406 and 408 (e.g., for "Friends" and "Family"). The controls 406 and 408 can identify the name of the group for which visibility is currently set for the user's promoted content.

An add other people control 410 can provide a way for adding additional individuals or groups to the existing groups for which visibility exists regarding the user's promoted content. For example, if the user selects the add other people control 410, another popup can appear from which the user can add visibility entities, as described below with reference to FIG. 5.

The controls 406 and 408 can further include delete controls 412 and 414, respectively, that the user can use to selectively delete either or both groups. For example, by selecting the delete control 412, the "Friends" group can be removed from visibility, and the group control 406 can disappear from the visibility change popup 402.

In some implementations, by clicking on the either of the controls 406 and 408, the user can view the names of the users in that group. For example, if the user selects the "Friends" control 412, then the user interface 200 can display a popup that lists the people in the user's circle of friends.

In some implementations, the visibility change popup 402 can display the user account 242 and the change control 246 that the user can select to switch to a different user login. The user may switch to a different user login, for example, in order to promote content to a different circle of family and friends, e.g., the family and friends associated with his other user login (e.g., UserX@ABCDmail.com).

A close control 416 can be used to exit the visibility change popup 402 and save the current settings and inputs. In some implementations, a cancel control can exist that can allow the user to exit the visibility change popup 402 without saving any changes, essentially restoring the values of the visibility change popup 402 to their original settings (e.g., before the user displayed the popup).

FIG. 5 shows an example groups selection list 502 for displaying selectable visibility groups. For example, the user interface 200 can display the groups selection list 502 if the user selects the add other people control 410 on the visibility change popup 402 as described above.

The groups selection list 502 can include group entries 504, each of which can identify the name of the group and can further include, in parentheses, the number of people in that group. For example, the group entries 504 can include a Family group 504a with seven members, a Friends group 504b with 105 members, and a coworkers group 504c with 25 members. In some implementations, the group entries 504 can include entries that are supersets or unions of two or more other groups. For example, a My Circles group 504d can represent the union of the Family, Friends and Coworkers groups 504a-c. As a result, the total membership in the My Circles group 504d (e.g., 137) can be the sum of the group memberships that the superset group includes (e.g., 7+105+ 25). An Anyone group 504e can apply to the group by which the user can promote content to everyone online, and the parenthetical membership for the Anyone group 504e can be "public on the web." In some implementations, by selecting the parenthetical membership number, the user interface 200 can display the list of individual members in the group. For example, the user may want to see the names of the people in a group as reminder of who the promoted content would be available.

In some implementations, each time the user selects a new group from the group entries 504, a selectable control for that group can appear in the visibility change popup 402, such as is shown for the Friends control 406 and the Family control 408. In some implementations, updating the controls in the visibility change popup 402 may not occur until after the user exits the groups selection list 502, such as by selecting an exit control 506.

Figure 6:
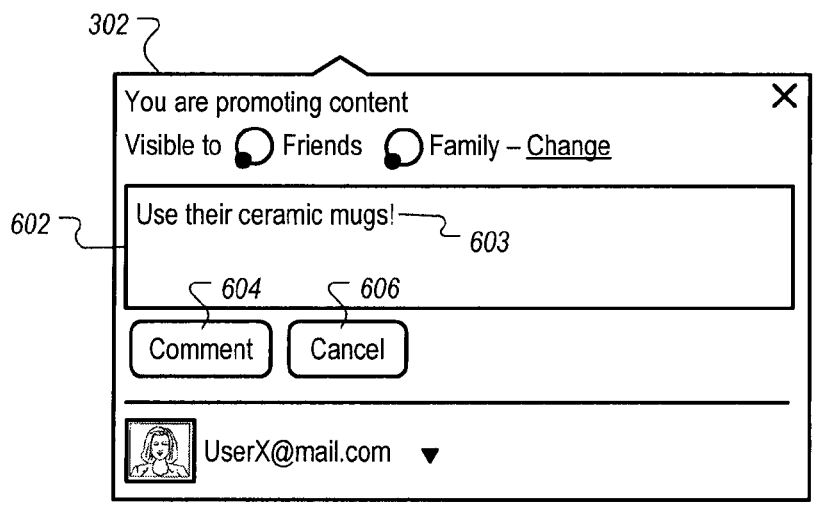
FIG. 6 shows an example add comment box for commenting on promoted content.

FIG. 6 shows an example add comment box 602 for commenting on promoted content. For example, the user can use the add comment box 602 to enter a comment associated with the content to be promoted (e.g., the activity stream content 202). The user interface 200 can display the add comment box 602, for example, if user selects the add a comment control 234. In some implementations, as soon as the user begins typing in the add comment box 602, any prompt message (e.g., "add comment . . . ") can be immediately replaced by a message 603 that the user types in.

By selecting a comment control 604, the user can save the message 603 that he has typed into the add comment box 602, and the saved message 603 can be displayed, for example, in the details popup 220. However, if the user decides not to keep the comment, the user can select a cancel control 606. Comments entered using the add comment box 602 can appear as annotations to the promoted activity stream content, if and when the content is served in lieu of an ad.

Figure 7A:
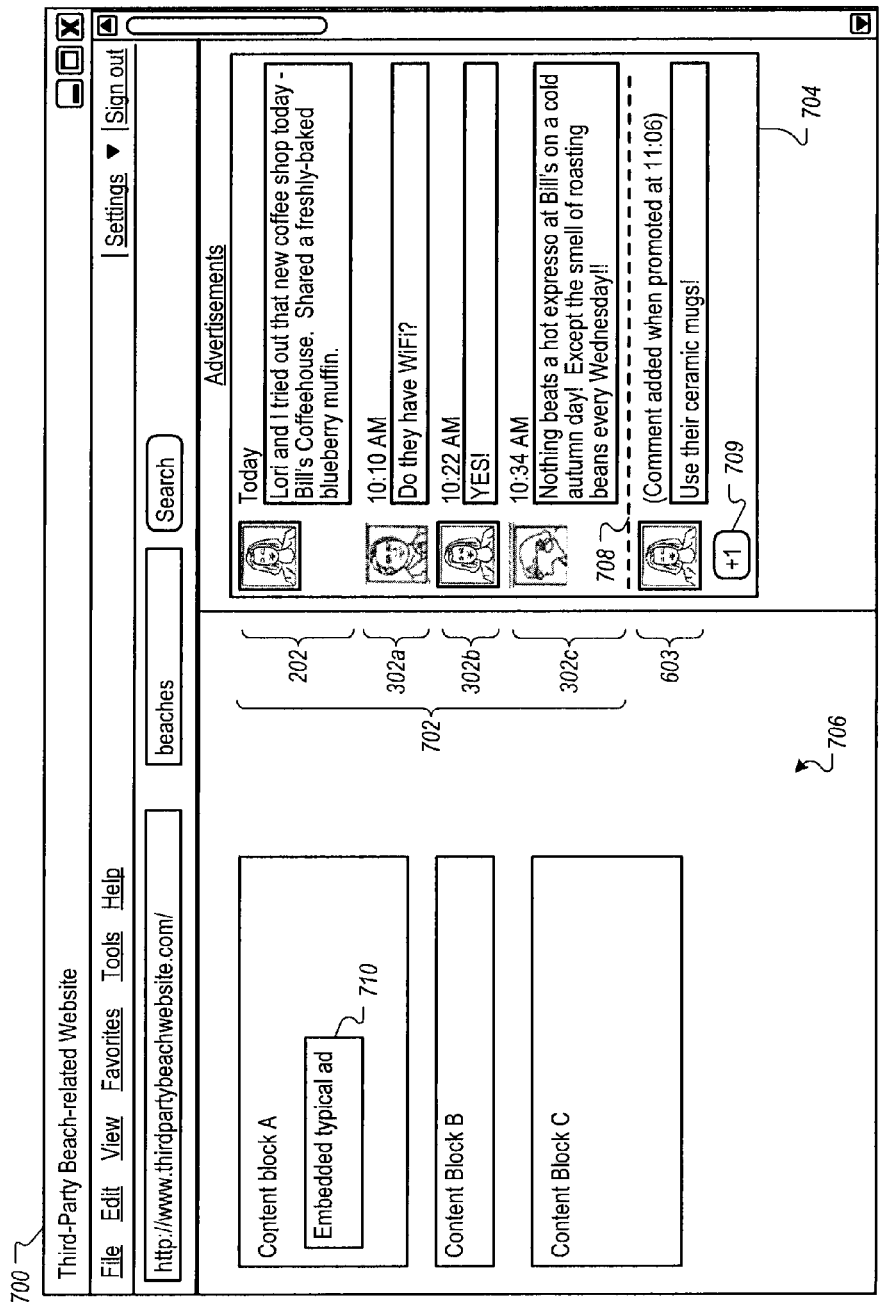
FIG. 7A shows an example web page with a non-advertising content item in an ad block.

FIG. 7A shows an example web page 700 with a non-advertising content item 702 in an ad block 704. As an example, the web page 700 can be on a third-party web site, independent from the source of non-advertising content item 702. The non-advertising content item 702, for example, can include the activity stream content 202 and/or 302a-302c that the user promoted on a social networking web site, as described above with reference to FIG. 3. The ad block 704 can also include the message 603 that the user generated in order to comment on, or attach a message to, the content. The message 603 can serve as an annotation to the non-advertising content item 702. A dividing line 708 can separate the non-advertising content item 702 from the message 603 or any other annotation. The promoted activity stream content that comprises the non-advertising content item 702 is served in lieu of an ad that would otherwise be served in the ad block 704. The ad management system 110 can periodically serve non-advertising content, such as the non-advertising content item 702, based on various criteria. For example, the criteria can include rankings that are generated for one or more ads that could be served and rankings of the item (e.g., the non-advertising content item 702). For example, the ad management system 110 can generate and use the rankings.

In some implementations, the annotation that includes the message 603 can also include a re-publication control 709. By selecting the re-publication control 709, for example, the user (e.g., the recipient of the non-advertising content item 702) can re-publish the non-advertising content item, such as to a social networking web site or other destination.

In some implementations, non-advertising content, such as the non-advertising content item 702, can appear anywhere on a web page. For example, non-advertising content such as the non-advertising content item 702 can appear in an ad (e.g., an embedded ad 710) anywhere within a main content area 706.

In some implementations, controls can exist by which the user can access the ad that would have appeared had not it been replaced by the non-advertising content item. For example, a curious user can use such a control to see the ad that the non-advertising content item replaced.

In some implementations, ad management system 110, for example, can compensate a publisher when non-advertising content items are provided in lieu of ads. For example, the ad management system 110 may charge the provider of the non-advertising content item a nominal fee for publication, and all or part of the fee can be given to the publisher. In some implementations, the ad management system 110 may not charge a fee to the provider when non-advertising content is served in lieu of an ad.

Figure 7B:
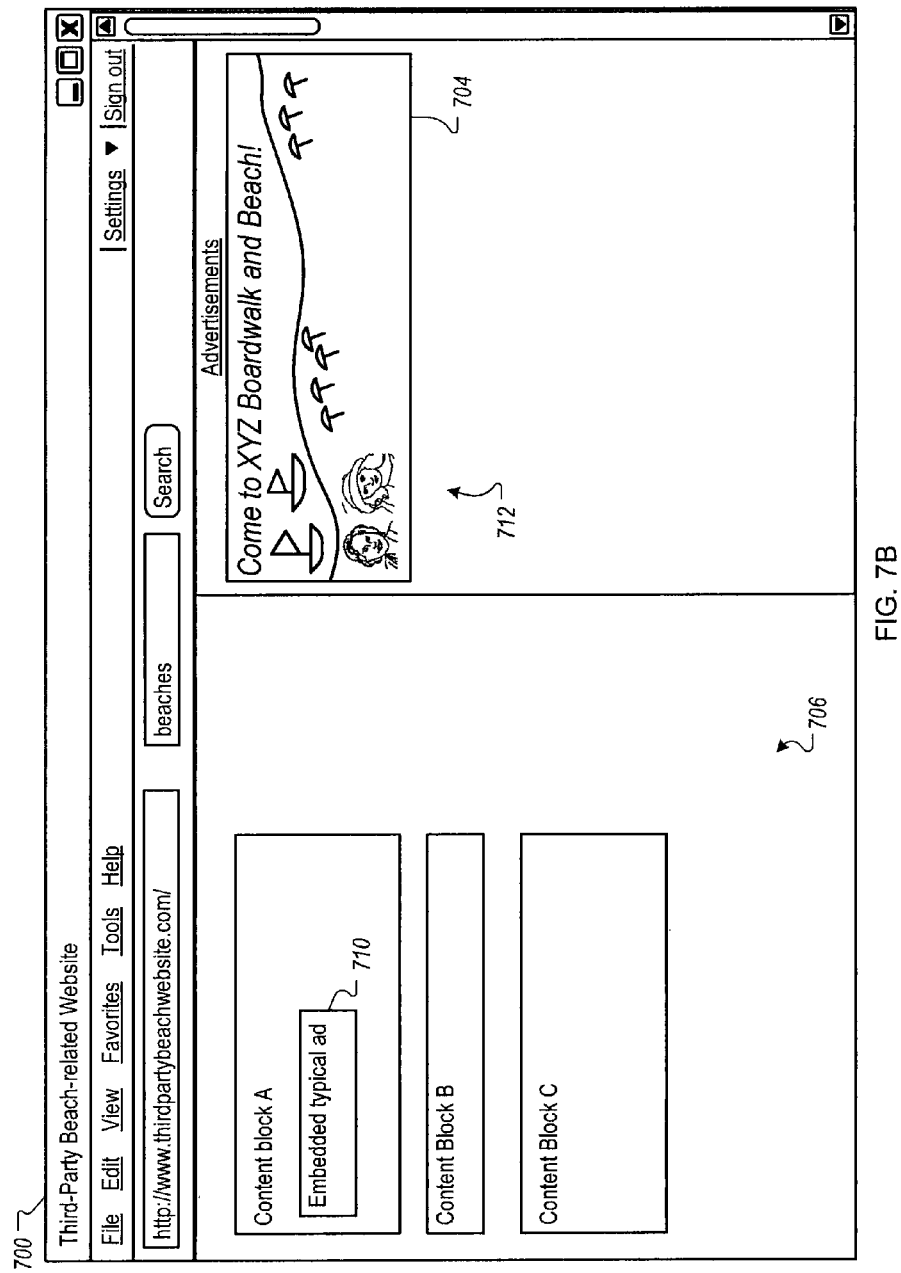
FIG. 7B shows an example web page with a typical ad in the ad block.

FIG. 7B shows an example web page 700 with an ad 712 in the ad block 704. As an example, the ad management system 110 can select an ad such as the ad 712 most of the time over the non-advertising content (e.g., the non-advertising content item 702) that would otherwise be served in lieu of the ad.

For example, a request can be received for an ad to be published on a web page by a publisher. One or more non-advertising content items responsive to the request can be determined. The non-advertising content items can include activity stream content that users have promoted, as described above with reference to FIGS. 2-3. The one or more non-advertising content items can be ranked, as well as eligible ads that are determined to be responsive to the request. The rankings of highest-ranked ad and the highest-ranked non-advertising content item can be evaluated based on one or more criteria. Based on the evaluation (e.g., if one of the eligible ads is ranked highest), one of the eligible ads (e.g., the ad 712) can be provided in response to the request. Otherwise (e.g., if one of the non-advertising content items evaluated is ranked highest), one of the non-advertising content items (e.g., the non-advertising content item 702) can be provided in response to the request.

Other factors can be used in evaluating the eligible ads and non-advertising content. In some implementations, the evaluation criteria can include criteria that relate to a relevance of the content item or the ad to the request. For example, in the same way that keywords can be used to select eligible ads, words in the non-advertising content (e.g., based on text in messages 209 and 309a-309c) can be used to determine relevancy of a content item to the ad request.

Other relevance factors can include, for example, the relationship between the user and the publisher 109, the number of times the content was promoted, the identities of the users who promoted the content, previous user behavior, inferred information such as information inferred from user profile(s), and the number of times the promoted content appeared in an ad block and was shared (or re-published) from that location, to name a few examples.

In some implementations, the evaluation criteria can include criteria that relate to how often ads are served in response to a request. For example, the ad management system 110 can use a policy (e.g., as directed by advertisers and/or publishers) to serve ads for a request a minimum threshold percentage of the time. As an example, non-advertising content can be served at most 2% of the time, and ads can be served at least 98% of the time. These example percentages can vary by ad request, type of ad, time-of-day, advertiser, publisher, or many other factors.

In some implementations, the evaluation criteria can include a location of the user, a current date and time of the request, and/or the publisher(s) of the advertisement or the highest-ranked non-advertising content. For example, the ad management system 110 can use a policy that makes it more likely to serve non-advertising content when the user is at home, and more likely to serve ads when the user is away from home. The ad management system 110 can also use a policy that serves a higher (or lower) percentage of non-advertising content items in the evening hours, or by some other schedule. Further, the ad management system 110 can serve a higher percentage of non-advertising content items for some publishers than for others (e.g., as directed by advertisers and/or publishers).

In some implementations, the evaluation criteria can include criteria that relate to how high a relevance is for the non-advertising content item and how low a relevance is of the highest-ranked ad. For example, the ad management system 110 may determine that, for a particular ad request, eligible ads have a relatively low relevance (e.g., based on keywords). At the same time, the ad management system 110 may determine that one or more non-advertising content items have a relatively higher relevance. In this case, the ad management system 110 can serve one of the non-advertising content items in lieu of an ad.

Figure 8:
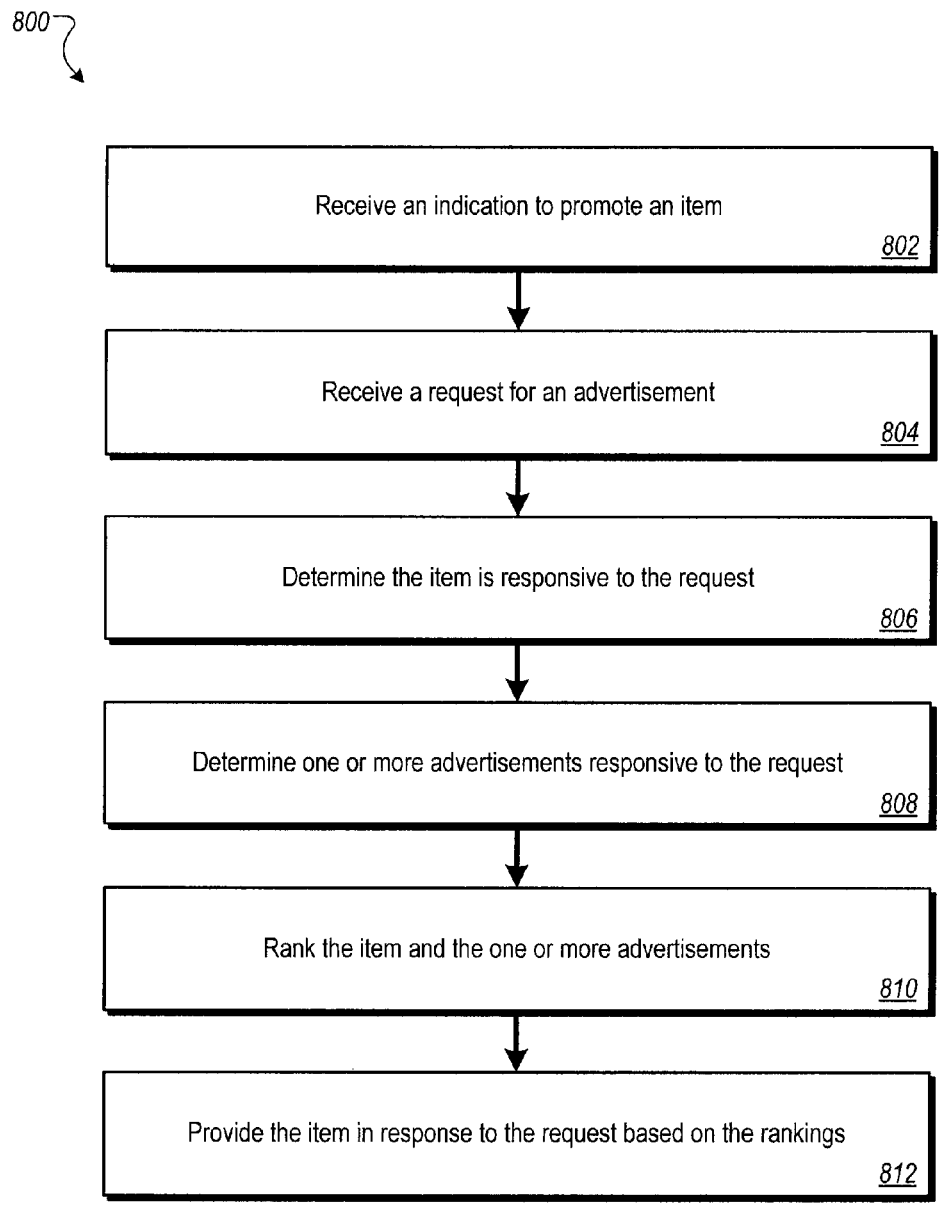
FIG. 8 is a flowchart of an example process for promoting activity stream content.

FIG. 8 is a flowchart of an example process 800 for promoting activity stream content. For example, the process 800 can be used to promote activity stream content 202 using the control 204. The process 800 can be performed, for example, by the ad management system 110 and social networking systems 120.

An indication is received from a user to promote an item that is included in an activity stream associated with the user (802). The activity stream is presented in a social context by a social application. As an example, a user may be on the Internet using a social networking website to interact with family and friends, such as using the user interface 200 described above with reference to FIG. 2. The user may be viewing entries in an activity stream, such as the posting 206 in the activity stream 208. Upon reading the message 209, the user may decide to promote the content by selecting the "Promote" control 204. In another example, referring to FIG. 3, the user may have an interest in promoting the conversation represented by the message 209 and the responsive messages 309a-309c. In this example, the user can select the control 304d to promote the entire social conversion represented by the posting 206 and the postings 306a-306c.

In some implementations, the non-advertising content items that are received can include metadata. For example, the metadata can identify the person who promoted the content and the other people who are intended recipients of the content. The people may include, for example, the user's family and/or friends that are identified, for example, using the details popup 220. In some implementations, the metadata can identify the source of the non-advertising content, such as the URL, and names, titles or other identifiers of the social networking website, blog entry, web page or news item from which the content was promoted. In some implementations, the non-advertising content items and associated metadata can be stored, e.g., in the non-advertising content data store 115.

A request for an ad is received (804). For example, a user (generally, but not always, different from the user who promoted the content) may be running a web browser on a user device 106. When a resource 105 is to be displayed in the browser, the ad management system 110 can receive a request for ads to be provided in ad slots within the resource 105.

The item is determined to be responsive to the request (806). For example, the item determined can be a non-advertising content item that is related in some way to the ad request. In some implementations, the relationship can be based on keywords related to the ad that match one or more words in the non-advertising content item, an inferred relevance to the user's interests, and/or whether the user is a candidate to receive the non-advertising content. For example, if the ad request is related to beaches, one or more non-advertising content items that include the word "beach" somewhere in the item (e.g., in the message 209 that says, "we went to the beach today.") can be identified.

Another factor in determining whether the item is responsive to the request can be based on the identification of the user from whom the ad request is received. For example, for an item to be responsive to a request for an ad to be served to User Y, the person who promoted the content (e.g., User X promoting activity stream content) had to have made the content visible (or available) to User Y. If User Y has no family or friends, for example, or whose family or friends' content-promoting results in no available non-advertising content items for use in ads served to user Y, then this step 806 can result in no items being determined as responsive to the request. In this example, determining if an item is responsive to an ad request for user Y can use the metadata that is stored in the non-advertising content item data store 115, e.g., metadata that is related to the people who have visibility to the item.

In some implementations, the determination of items that are responsive to the request can be performed by the ad management system 110. In some implementations, the determination can be performed by the non-advertising content providers 111, e.g., when requested by the ad management system 110.

One or more ads are determined to be responsive to the request (808). For example, as described above with reference to FIG. 1, the ad management system 110 can identify eligible ads that are responsive to an ad request.

The item and the one or more ads are ranked (810). For example, the ad management system 110 can rank the item and the eligible ads based on relevance criteria, including, for example, matching text included in the item and keywords associated with eligible ads to keywords associated with the ad request.

Based at least in part on the rankings, the item is provided in response to the request rather than the one or more ads (812). For example, referring to FIG. 7A, the non-advertising content item 702 can be provided for display within the ad block 704. In this example, the non-advertising content item 702 can be provided instead of the ad 712 because of at least the rankings determined at step 810.

Figure 9:
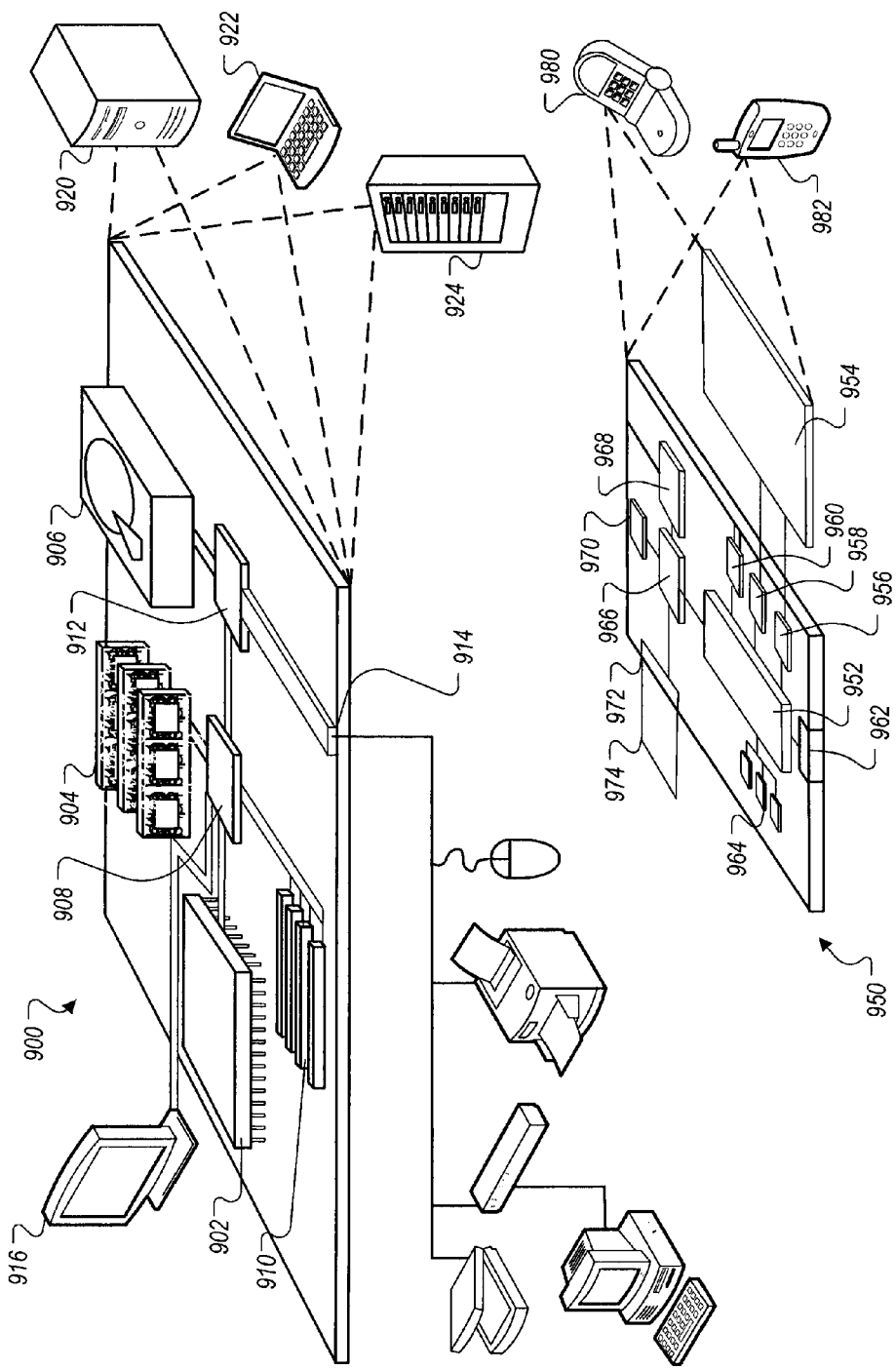
FIG. 9 is block diagram of an example computer system that can be used to implement the methods, systems and processes described in this disclosure.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   providing a control for presentation on a user interface for enabling a user to promote, to one or more other users, a non-sponsored content item that is included in an activity stream associated with the user, the activity stream being presented in a social context;
   receiving an indication from the user to promote the non-sponsored content item;
   receiving a second request for a sponsored content item to be placed in a slot within a first website, wherein the first website is different from a second website associated with the activity stream and wherein the second request for the sponsored content item is based on a first request for content from one of the one or more other users;

determining, by one or more processors, that the non-sponsored item is responsive to the second request based on determining a relevance of the non-sponsored content item to criteria associated with the second request;

determining one or more sponsored content items responsive to the second request based on determining a relevance of the one or more sponsored content items to the criteria associated with the second request;

ranking the one or more sponsored content items and comparing, by the one or more processors, a highest ranked sponsored content item of the one or more sponsored content items to the non-sponsored content item using the determined relevances; and providing the non-sponsored content item in response to the second request rather than the one or more sponsored content items based at least in part on the comparing.

2. A method comprising:

receiving a request from a user device associated with a first user for a sponsored content item to be published on a web page by a publisher, the first user being included in a social network;

determining, by one or more processors, one or more non-sponsored content items responsive to the request, wherein the non-sponsored content items have been identified as being eligible to be presented to the first user, wherein each of the non-sponsored content items has been promoted by a corresponding second user in the social network for publication to the first user, and wherein the non-sponsored content items have been identified as being eligible to be presented within a first website different from a second website of the social network;

ranking, by the one or more processors, the one or more non-sponsored content items; and providing one of the one or more non-sponsored content items rather than an otherwise most relevant sponsored content item in response to the request and based at least in part on the rankings.

3. The method of claim 2 further comprising:

determining one or more sponsored content items responsive to the request;

ranking the one or more sponsored content items; and evaluating a highest-ranked sponsored content item and a highest-ranked non-sponsored content item based on one or more criteria, where providing the one or more non-sponsored content items is based at least in part on the evaluation.

4. The method of claim 3 where the one or more criteria are based on a relevance of the non-sponsored content item or the sponsored content item to the request.

5. The method of claim 3 where the one or more criteria are based on how often sponsored content items are served in response to the request.

6. The method of claim 3 where the one or more criteria are based on how high a relevance is for the non-sponsored content item and how low a relevance is of the highest-ranked sponsored content item.

7. The method of claim 3 where the one or more criteria are based on a location of the user, a current date and time of the request, the publisher(s) of the sponsored content item and/or the highest-ranked non-sponsored content.

8. The method of claim 2 further comprising:

compensating the publisher by a system that provides the non-sponsored content item.

9. The method of claim 8 further comprising charging a provider of the non-sponsored content item a predetermined fee for publication.

10. The method of claim 8 further comprising charging the provider of the non-sponsored content item no fee for publication.

11. The method of claim 2 further comprising:

receiving one or more non-sponsored content items and metadata describing content included therein; and storing the one or more non-sponsored content items and the metadata.

12. The method of claim 11 where the metadata is used to rank the one or more non-sponsored content items.

13. The method of claim 11 where receiving the one or more non-sponsored content items includes receiving a selection of a content item from a user.

14. The method of claim 13 where the selection is a selection of a content item authored by the user.

15. The method of claim 2 where one or more of the one or more non-sponsored content items does not include a link to a landing page.

16. The method of claim 2 where one or more of the one or more non-sponsored content items is selected from a group consisting of: blog entries, web pages, news items, videos, music, images, games, and any other multimedia content.

17. The method of claim 13 where the selection is a selection of a control that allows for publication of a content item.

18. The method of claim 17 where the control is presented in a toolbar.

19. The method of claim 17 where the selection includes a message from the user to be published along with the non-sponsored content item.

20. The method of claim 19 where the message is displayed as an annotation with the non-sponsored content item.

21. The method of claim 20 where the annotation includes a message portion and a re-publication control to allow a recipient to re-publish the non-sponsored content item.

22. The method of claim 17 where the control is associated with an application.

23. The method of claim 22 where the application is an operating system of a user device.

24. The method of claim 22 where the application is a browser.

25. A method comprising:

receiving, based on a first request from a user device associated with a first user, a second request for a sponsored content item to be displayed in a slot on a web-page or search results page associated with a publisher, wherein the first user is a member of a social network;

identifying, using one or more processors, a non-sponsored content item responsive to the second request, wherein the non-sponsored content item has been identified as being eligible to be presented to the first user, wherein the non-sponsored content item has been promoted by a second user in the social network for publication to the first user, and wherein the non-sponsored content item has been identified as being eligible to be presented within a first website different from a second website of the social network;

identifying a sponsored content item responsive to the second request;

evaluating, using the one or more processors, a relevance of the non-sponsored content item and the sponsored content item to the second request; and providing one of the sponsored content item or the non-sponsored content item based at least in part on the evaluation.

26. A computer program product tangibly embodied in a computer-readable storage device comprising instructions executable by one or more processing devices to perform operations comprising:

receiving a request from a user device associated with a first user for a sponsored content item to be published on a web page by a publisher, the first user being included in a social network;

determining one or more non-sponsored content items responsive to the request, wherein the non-sponsored content items have been identified as being eligible to be presented to the first user, wherein each of the non-sponsored content items has been promoted by a corresponding second user in the social network for publication to the first user, and wherein the non-sponsored content items have been identified as being eligible to be presented within a first website different from a second website of the social network;

ranking the one or more non-sponsored content items; and providing one of the one or more non-sponsored content items in response to the request and based at least in part on the rankings rather than an otherwise most relevant sponsored content item.

27. The computer program product of claim 26 further comprising instructions for:

determining one or more sponsored content items responsive to the request;

ranking the one or more sponsored content items; and evaluating a highest-ranked sponsored content item and a highest-ranked non-sponsored content item based on one or more criteria, where providing the one or more non-sponsored content items is based at least in part on the evaluating.

28. The computer program product of claim 27 wherein the one or more criteria are based on one or more of: (i) a relevance of the non-sponsored content item or the sponsored content item to the request, (ii) how often sponsored content items are served in response to the request, (iii) how high a relevance is for the non-sponsored content item and how low a relevance is of the highest-ranked sponsored content item, (iv) a location of the user, (v) a current date and time of the request, (vi) the publisher(s) of the sponsored content item, or (vii) the highest-ranked non-sponsored content.

29. The computer program product of claim 26 further comprising instructions for:

receiving one or more non-sponsored content items and metadata describing content included therein; and storing the one or more non-sponsored content items and the metadata.

30. The computer program product of claim 29 where the metadata is used to rank the one or more non-sponsored content items.

31. The computer program product of claim 29 where receiving the one or more non-sponsored content items includes receiving a selection of a content item from a user.

32. The computer program product of claim 31 where the selection is a selection of a content item authored by the user.

33. The computer program product of claim 26 wherein one or more of the non-sponsored content items do not include a link to a landing page.

34. The computer program product of claim 26 wherein one or more of the one or more non-sponsored content items are selected from a group consisting of: blog entries, web pages, news items, videos, music, images, games, and any other multimedia content.

35. The computer program product of claim 31 where the selection is a selection of a control that allows for publication of a content item.

36. A system comprising:

memory storing instructions that are executable; and one or more processing devices to execute the instructions to perform operations comprising:

receiving a request from a user device associated with a first user for a sponsored content item to be published on a web page by a publisher, the first user being included in a social network;

determining one or more non-sponsored content items responsive to the request, wherein the non-sponsored content items have been identified as being eligible to be presented to the first user, wherein each of the non-sponsored content items has been promoted by a corresponding second user in the social network for publication to the first user, and wherein the non-sponsored content items have been identified as being eligible to be presented within a first website different from a second website of the social network;

ranking the one or more non-sponsored content items; and providing one of the one or more non-sponsored content items in response to the request and based at least in part on the rankings rather than an otherwise most relevant sponsored content item.

37. The system of claim 36 wherein the one or more processing devices are further configured to:

determine one or more sponsored content items responsive to the request;

rank the one or more sponsored content items; and evaluate a highest-ranked sponsored content item and a highest-ranked non-sponsored content item based on one or more criteria, wherein providing the one or more non-sponsored content items is based at least in part on the evaluation.

38. The system of claim 37 wherein the one or more criteria are based on one or more of: (i) a relevance of the non-sponsored content item or the sponsored content item to the request, (ii) how often sponsored content items are served in response to the request, (iii) how high a relevance is for the non-sponsored content item and how low a relevance is of the highest-ranked sponsored content item, (iv) a location of the user, (v) a current date and time of the request, (vi) the publisher(s) of the sponsored content item, or (vii) the highest-ranked non-sponsored content.

39. The system of claim 36 wherein the one or more processing devices are further configured to:

receive one or more non-sponsored content items and metadata describing content included therein; and store the one or more non-sponsored content items and the metadata.

40. The system of claim 39 where the metadata is used to rank the one or more non-sponsored content items.

41. The system of claim 39 wherein receiving the one or more non-sponsored content items includes receiving a selection of a content item from a user.

42. The system of claim 41 where the selection is a selection of a content item authored by the user.

43. The system of claim 36 wherein one or more of the non-sponsored content items do not include a link to a landing page.

44. The system of claim 36 wherein one or more of the one or more non-sponsored content items are selected from a group consisting of: blog entries, web pages, news items, videos, music, images, games, and any other multimedia content.

45. The system of claim 41 where the selection is a selection of a control that allows for publication of a content item.

* * * * *